PERCIVAL T. G. STOCKMAN.
Improvement in Amalgamating Gold and Silver Ores.
No. 121,554.                                  Patented Dec. 5, 1871.
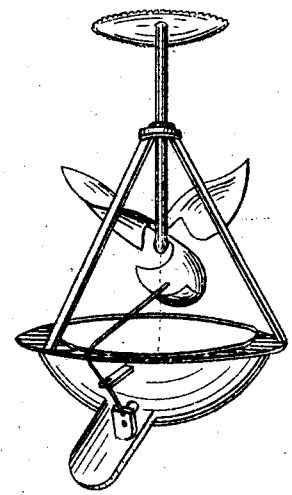
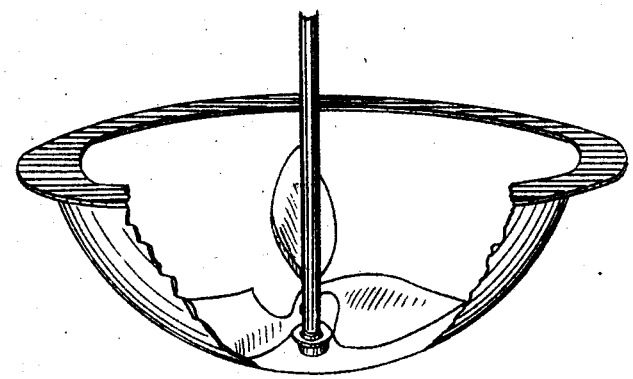

121,554

UNITED STATES PATENT OFFICE.

PERCIVAL T. G. STOCKMAN, OF BROOKLYN, NEW YORK.

IMPROVEMENT IN PROCESSES OF AMALGAMATING GOLD AND SILVER ORES.

Specification forming part of Letters Patent No. 121,554, dated December 5, 1871.

*To all whom it may concern:*

Be it known that I, PERCIVAL T. G. STOCKMAN, of the city of Brooklyn, county of Kings and State of New York, have invented a new and useful Machine and Process for the Purpose of Amalgamating Gold and Silver Ores, of which the following is a full and explicit description.

The amalgamator is an iron vessel or caldron, similar to those used for evaporating sugar-cane juice. In the center of the bottom of the amalgamator there is an iron socket intended to receive the spindle of a perpendicular shaft. Attached to this shaft are three or more fans, similar to the fans of a propeller. At the top of the shaft there is a small cog-wheel, by which the motive power is applied, either steam, horse, or water-power, as the circumstances of the case will admit.

When in operation the object of this shaft and fan is to keep the ground metallic substance in motion, as it were mixing it. After the ground ore is placed in the amalgamator with sufficient water to keep it of a thin muddy consistency it is allowed to boil for fifteen minutes, and then, the metal having expanded sufficiently by the boiling, quicksilver is introduced and is immediately thrown into millions of minute globules, and has a better affinity for the ores than when introduced in a cold dead state, according to the old process.

In the case of pure ores amalgamation is completed in one hour without the use of any other chemicals. More frequently, however, gold and silver ores are found in combination with the sulphurets of antimony, arsenic, and mercury, and with the pyrites of iron, copper, and argentiferous galena.

When ores are found in composition with any of the above-mentioned sulphurets or pyrites I propose to introduce a chemical solution of my own invention, consisting of chloride of sodium, nitrate of potassa; and in some instances it may be necessary to use calx, bisulphuret of carbon, and any of the fixed and volatile oils, especially when orpiment (sesquisulphuret of arsenic) exists in combination with the pyrites; and I would also introduce muriatic acid in combination with sulphureted hydrogen, as the arsenic is entirely soluble in muriatic acid by the aid of heat, with the evolution of the sulphureted hydrogen.

As in the case of the pure ore the ground mixture is allowed to boil for fifteen minutes, the chemicals having been added, and then quicksilver is introduced and the whole substance is allowed to boil for two hours longer. At the expiration of two hours a stream of cold water is introduced to precipitate the amalgam, and the whole mixture is allowed to pass from an outlet in the bottom of the amalgamator to a sluice containing riffles, in which the amalgam is gathered, and it is then ready for the retort, to be evaporated and the metal extracted.

I lay no claim to the system of retorting, nor using salt, lime, &c., as by the old process.

From the above description of my process all intelligent miners will see at once that it is impossible for me to give any fixed rule for the quantities of the various chemicals made use of, owing to the fact that it is scarcely probable that any two ores are impregnated alike; and the quantity of the different chemicals which are necessary for the production of the required result can only be determined by ascertaining with what foreign substance the ores may be impregnated; but the following formula will be found to approximate the requisite proportions for the average qualities of ores.

Formula for treating, in combination with heat and motion, gold and silver ores. For every ton of ground mineral ore use the following chemicals: No. 1, chloride of sodium, three pounds. No. 2, nitrate potassa, three and a half pounds. No. 3, calx, four pounds. No. 4, bisulphuret of carbon, ten fluid ounces. No. 5, muriatic acid, eight fluid ounces. No. 6, sulphureted hydrogen, five fluid ounces. No. 7, nitric acid, six fluid ounces.

The proportions indicated above may be varied to suit the exigencies of the case, some ores being more impregnated with foreign substances than others. When antimony with the pyrites is abundant, use Nos. 3, 4, 5, and 6 freely.

The reason so many persons have failed in gold and silver mining is that no process has heretofore been discovered by which the entire amount of the pure metal could be extracted. Miners have always based their calculations upon the assays made by scientific gentlemen from the small specimens sent to them, and have found when they came to work by the old process that the ore did not yield within from ten to twenty per centum of the assay. They attributed this to the fact that the ore was poorer than the specimens; but the real fact was that they were unable to get the entire amount of the pure metal from the ore.

By the use of the amalgamator and my processes I hold that no matter on how large a scale the mining is carried on the yield of pure metal will equal that of the most careful mint assay.

What I claim as my invention, and desire to secure by Letters Patent, is—

The process of amalgamating the precious ores, as specified, by first forming a paste with water, then expanding by heat, and so introduce the quicksilver in a condition to promote affinity, stirring the whole to hasten amalgamation, the chemicals specified to be used as occasion may require to overcome impurities of ores.

PERCIVAL T. G. STOCKMAN.

Witnesses:
  C. A. BENEDICT,
  A. LEGGETT.